No. 732,024. PATENTED JUNE 23, 1903.
C. H. GUNN.
TENPIN CENTERING AND LEVELING DEVICE.
APPLICATION FILED JUNE 6, 1902.
NO MODEL. 2 SHEETS—SHEET 1.
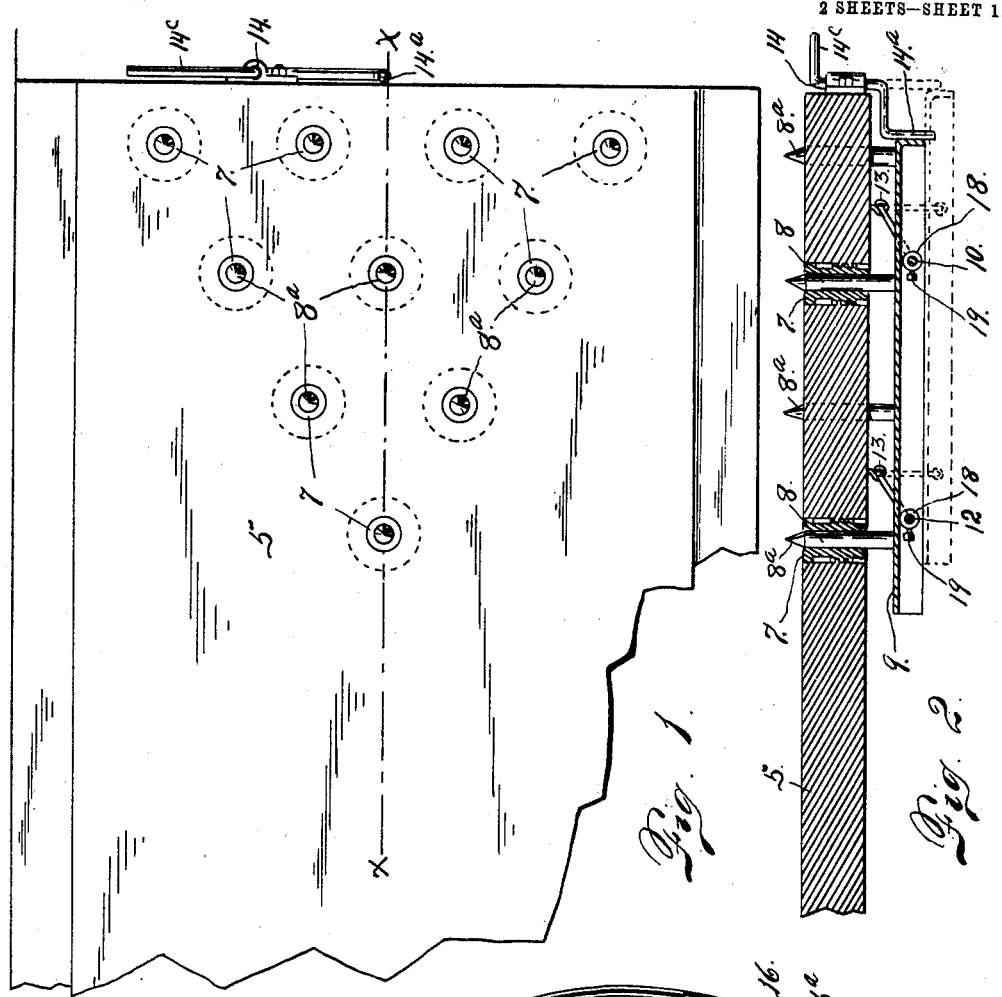
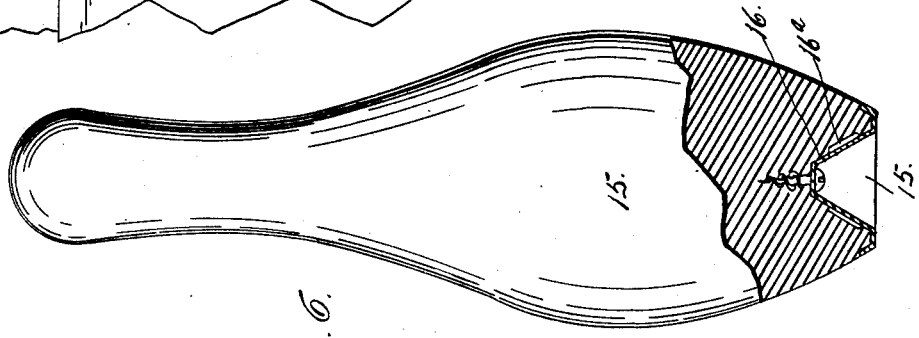
WITNESSES: INVENTOR.
Dena Nelson. Chas H Gunn
O. E. Hoddick BY
ATTORNEY.

No. 732,024. PATENTED JUNE 23, 1903.
C. H. GUNN.
TENPIN CENTERING AND LEVELING DEVICE.
APPLICATION FILED JUNE 6, 1902.
NO MODEL. 2 SHEETS—SHEET 2.
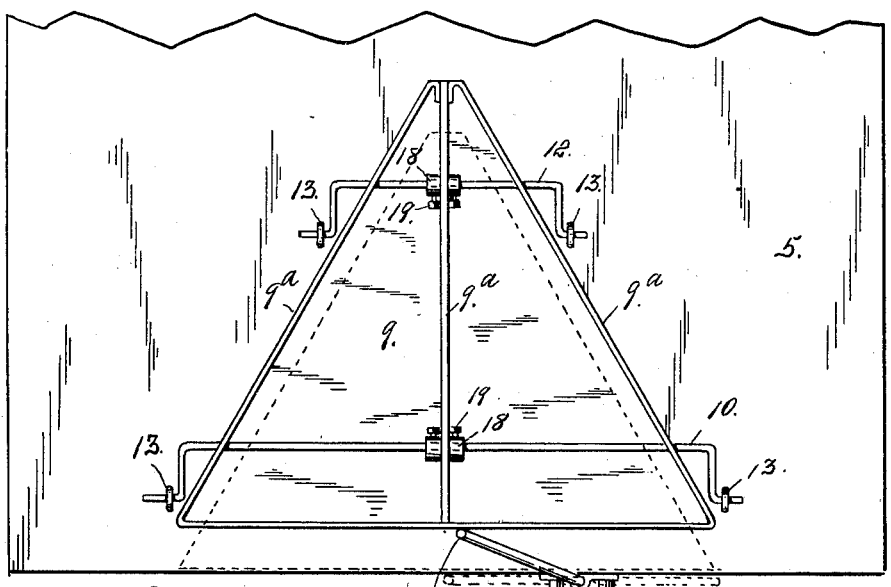
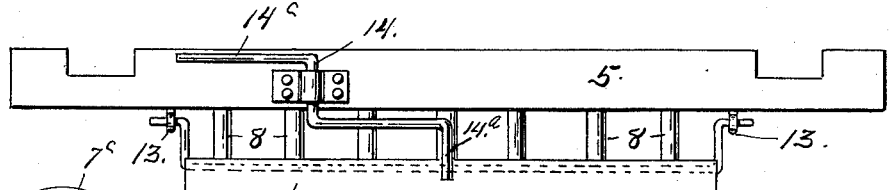
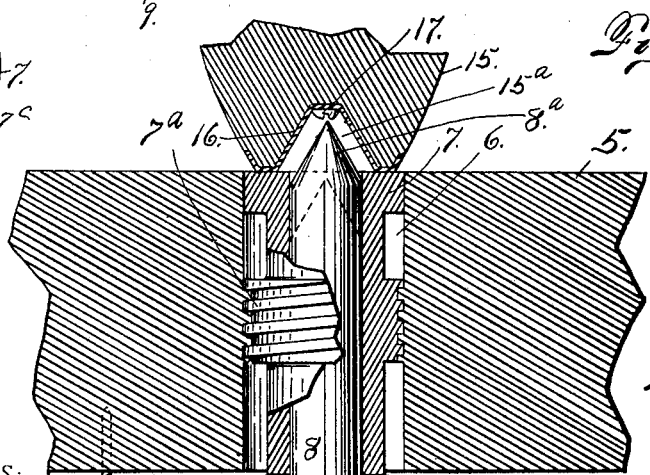
WITNESSES:
Dena Nelson.
O. E. Hoddick.
INVENTOR.
Chas. H. Gunn.
BY
ATTORNEY.

No. 732,024.

Patented June 23, 1903.

UNITED STATES PATENT OFFICE.

CHARLES H. GUNN, OF DENVER, COLORADO.

TENPIN CENTERING AND LEVELING DEVICE.

SPECIFICATION forming part of Letters Patent No. 732,024, dated June 23, 1903.

Application filed June 6, 1902. Serial No. 110,463. (No model.)

*To all whom it may concern:*

Be it known that I, CHARLES H. GUNN, a citizen of the United States of America, residing at Denver, in the county of Arapahoe and State of Colorado, have invented certain new and useful Improvements in Tenpin Centering and Leveling Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means for centering and leveling tenpins, my object being to provide apparatus whereby the pins may be accurately located on the bed-spots and whereby their lower extremities may all be kept in the same horizontal plane and in the plane of the surrounding surface of the bed. Under the present practice these pins are never set up twice alike and are never accurately placed upon the bed-spots, since with the ordinary construction great care would be required to properly place the pins. Moreover, the bed sometimes becomes worn, forming recesses where the pins are placed, whereby their lower ends occupy the recesses, interfering with knocking them down.

My object is to remedy this difficulty; and to this end the invention consists of the features, arrangements, and combinations hereinafter described and claimed, all of which will be fully understood by reference to the accompanying drawings, in which is illustrated an embodiment thereof.

In the drawings, Figure 1 is a top or plan view of a tenpin-bed equipped with my improved leveling and centering apparatus. Fig. 2 is a section taken on the line $x\ x$, Fig. 1. Fig. 3 is an underneath view, and Fig. 4 an end view, of the same. Fig. 5 is a fragmentary view, partly in section, the parts being shown on an enlarged scale. Fig. 6 shows a tenpin partly in section equipped with my improvement. Fig. 7 is a top view of one of the hollow adjustable leveling-plugs forming the pin-spots in the bed.

The same reference characters indicate the same parts in all the views.

Let the numeral 5 designate the tenpin-bed, which is provided with holes 6, having interior screw-threads. Plugs 7, provided with exterior threads $7^a$, are screwed into the openings. These plugs form the bed-spots for the location of the tenpins. The plugs 7 are hollow, and through them are passed centering-pins 8, mounted on a swinging platform 9, located beneath the bed. The lower extremities of the centering-pins rest loosely on the upper surface of the platform, whereby the latter has a limited sliding movement beneath the said pins, the latter maintaining a vertical position. As shown in the drawings, this platform is supported by crank-shafts 10 and 12, whose extremities are journaled in screw-eyes 13, inserted in the under surface of the plate. The bodies of the shafts pass through depending flanges $9^a$, formed in the platform, in which flanges the shafts are journaled. Made fast to each shaft on each side of the center flange $9^a$ is a collar 18, which is secured to the shaft by a set-screw 19. These collars prevent the platform from shifting laterally on the shafts. The upper extremities of the centering-pins 8 are cone-shaped, as shown at $8^a$, and are arranged to protrude above the upper surface of the bed when the platform is properly adjusted. (See Figs. 2 and 5.) This platform 9 if unsupported will normally assume its lowest position by gravity, whereby the pin-points $8^a$ are carried below the upper surface of the bed 5, as shown by dotted lines in Fig. 5. When it is desired to center the tenpins, the platform is swung upwardly, causing the pin-points to protrude, as shown by full lines in Figs. 2 and 5. In the drawings I have shown a crank 14, journaled in the bearing 15 on one end of the bed, for accomplishing this purpose. The platform 9 is located in the path of an arm $14^a$ of this crank when the latter is thrown inwardly beneath the bed, as shown in Fig. 2. The upper arm $14^c$ is employed to manipulate the crank for this purpose. When the pin-points are projected above the upper surface of the bed, the tenpins are set over them, and for this purpose the lower extremity of each pin 15 is provided with a conical or funnel-shaped recess $15^a$, having a metal lining 16, which is bent outwardly to cover the bottom of the pin around the recess, whereby the pin is protected from being jammed or broken. As shown in the drawings, this metal lining or shield is held in place by a screw 17. To prevent the part 16 from turning on the pin, it is provided with tongues 16ª, which engage grooves formed in the recessed portion of the pin. As soon as the pins are in position the crank 14 is adjusted to allow the platform to drop, whereby the centering-pins are thrown below the upper surface of the bed. The position of the platform may be regulated by adjusting the screw-eyes 13, forming the bearings for the shafts, whereby the distance which the centering-pins protrude above the bed may be regulated at will.

Each leveling-plug 7 is provided at the top with recesses 7ᶜ, adapted to receive a wrench (not shown) for adjusting purposes. By the adjustment of these plugs the lower extremities of the tenpins may be kept in the same horizontal plane and in the plane of the surrounding surface of the bed.

If desired, a stop-collar 20, held in place by a set-screw 21, may be applied to each centering-pin below the bed in order to limit the upward movement of the pins. This construction is shown in Fig. 5, but is not shown in the other views.

Having thus described my invention, what I claim is—

1. In means for centering tenpins, the combination with the bed having openings, a platform laterally and vertically movable beneath the bed, centering-pins resting loosely on the bed and entering the bed-openings, and means for actuating the platform to cause the centering-pins to protrude above the upper surface of the bed.

2. In apparatus of the class described, the combination with the tenpin-bed having openings, centering-pins movable vertically in the said openings, a movable support for the centering-pins and upon which the lower extremities of the latter rest and slide freely, said support being located beneath the bed and laterally and vertically movable, and means for adjusting said support to cause the centering-pins to protrude above the bed, substantially as described.

3. The combination with the tenpin-bed having openings, of a platform located beneath the bed and mounted to have a lateral and vertical movement, centering-pins loosely mounted on the said platform upon which their lower extremities rest and movable in the openings of the bed, and means for actuating the platform to cause the centering-pins to protrude above the surface of the bed.

4. The combination of a tenpin-bed having openings positioned to indicate the location of the tenpins when in place, a platform located beneath the bed and having a lateral and vertical movement, crank-shafts journaled beneath the bed and upon which the platform is mounted, centering-pins resting loosely on the platform and engaging the openings in the bed, and means for actuating the platform to cause the centering-pins to protrude above the upper surface of the bed.

5. The combination of a tenpin-bed having openings, hollow, vertically-adjustable plugs located in said openings, centering-pins entering the hollows of the plugs in which they are free to move, and a laterally and vertically movable platform located beneath the bed, on which platform the pins rest loosely.

6. The combination of a tenpin-bed having threaded openings, hollow plugs screwed into said openings, centering-pins engaging openings formed in the plugs, a suitable laterally and vertically movable platform upon which the centering-pins rest loosely, and means for adjusting the platform.

7. The combination of a tenpin-bed having openings, centering-pins engaging said openings and movable vertically therein, a swinging platform upon which the centering-pins rest loosely, the said pins having conical upper extremities, substantially as described.

8. The combination with the tenpin-bed having openings, of centering-pins movably mounted in said openings, a platform upon which the lower extremities of the centering-pins rest and are free to slide, means for adjusting said pins whereby they may be made to protrude above the surface of the bed, and tenpins having openings in their lower extremities to receive the protruding extremities of the centering-pins, substantially as described.

9. In means for centering tenpins, the combination with the bed having openings, of centering-pins adapted to move vertically in said openings, a laterally and vertically movable platform movably mounted beneath the bed and forming a support for the centering-pins, a stop-collar applied to each centering-pin below the bed, and means for actuating the platform to cause the centering-pins to protrude above the upper surface of the bed.

In testimony whereof I affix my signature in presence of two witnesses.

CHARLES H. GUNN.

Witnesses:
DENA NELSON,
A. J. O'BRIEN.